March 10, 1936.  G. MOORE  2,033,533
WATER SOFTENER APPARATUS
Filed Sept. 1, 1933  3 Sheets-Sheet 1

March 10, 1936. G. MOORE 2,033,533
WATER SOFTENER APPARATUS
Filed Sept. 1, 1933 3 Sheets-Sheet 2

Inventor:
George Moore
By Edgar M. Kitchin
His Attorney.

March 10, 1936.　　　　G. MOORE　　　　2,033,533
WATER SOFTENER APPARATUS
Filed Sept. 1, 1933　　　3 Sheets-Sheet 3
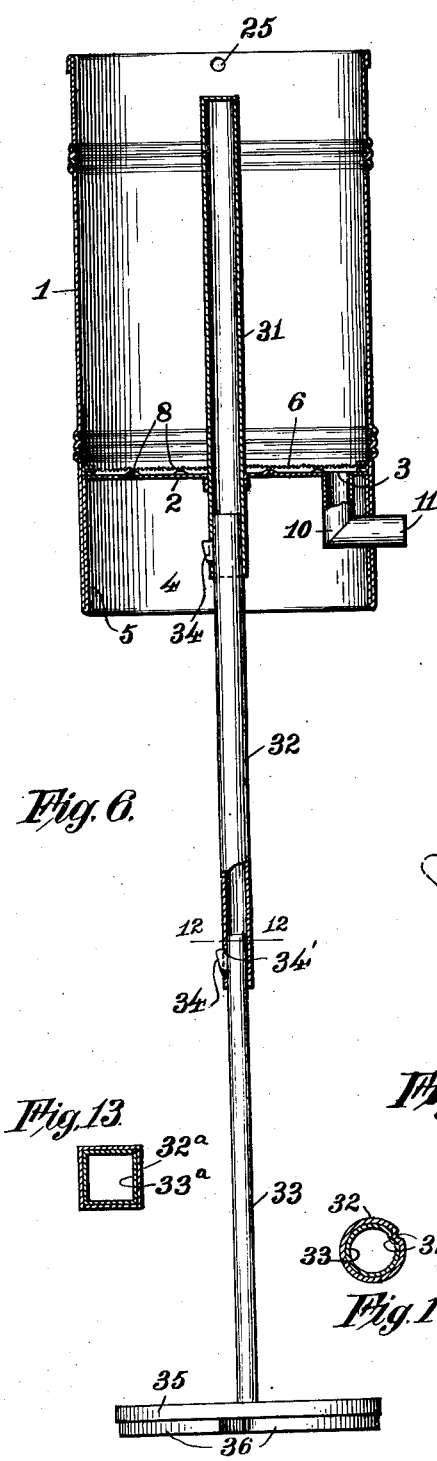
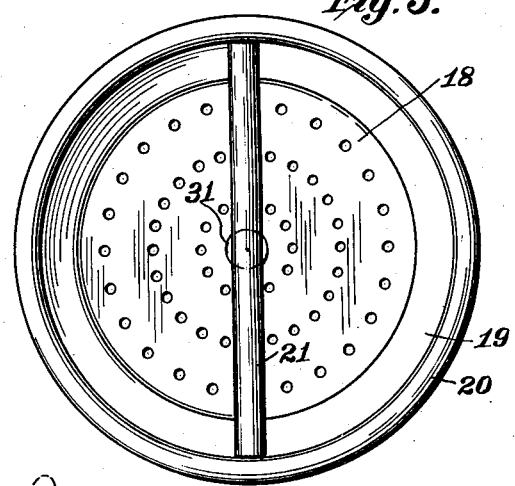
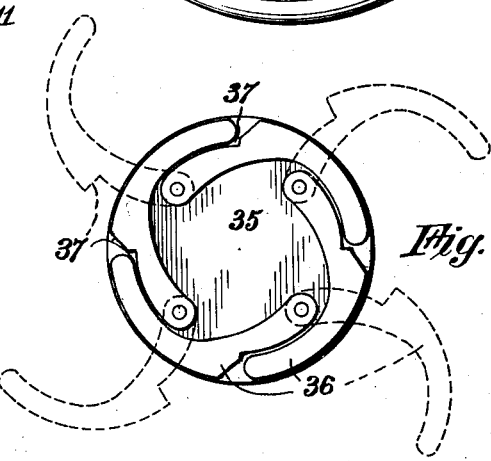
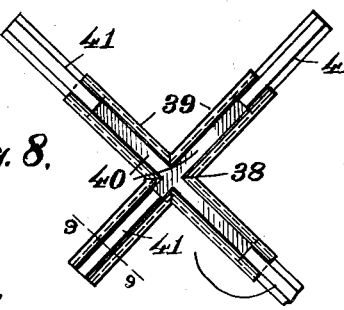
Inventor:
George Moore
By Edgar M. Kitchin
His Attorney Patented Mar. 10, 1936

2,033,533

UNITED STATES PATENT OFFICE 2,033,533

WATER SOFTENER APPARATUS

George Moore, Hastings-on-Hudson, N. Y.

Application September 1, 1933, Serial No. 687,869

6 Claims. (Cl. 210—24)

This invention relates to improvements in devices for the treatment of liquid, such as water, by percolation through a granular mass, such as a bed of known base exchange substances, zeolites for instance, and relates more particularly to portable or hand-operated apparatus of the type indicated.

The essential object in view is the production of a water softening device characterized by its inexpensiveness of construction and its simplicity and efficiency of operation.

A further object is to provide means for supporting the device in elevated position.

With these and other objects in view as will in part hereinafter become apparent and in part be stated, the invention comprises a receptacle having preferably an open top, a body of zeolites or like granular bed within and occupying an intermediate area of the receptacle, a perforate support for the granular bed spaced above the bottom of the receptacle, and a foraminous plate covering and spaced above the upper surface of the granular bed.

My invention further comprises a softener of the class mentioned equipped with a self-contained support adapted to be extended, when desired, to form a stand for the device and to be retracted or telescoped within the same when not in use.

The invention also comprises certain other novel constructions, combinations, and arrangements of parts as subsequently specified and claimed.

In the accompanying drawings,—

Figure 3 is a top plan view of the same.

Figure 6 is a detailed elevation of the supporting device, partly in section, with the receptacle shown in position thereon.

Figure 7 is a bottom plan view of the base of the support.

Figure 8 is a similar view of a modified form of base.

Figure 9 is a detailed section on line 9—9 of Figure 8.

Figure 10 is an elevation of a supporting hook for the softener.

Figure 12 is a detailed section on the line 12—12 of Figure 6, upon an enlarged scale, and Figure 13 is a similar view of a modified form.

Figure 4:
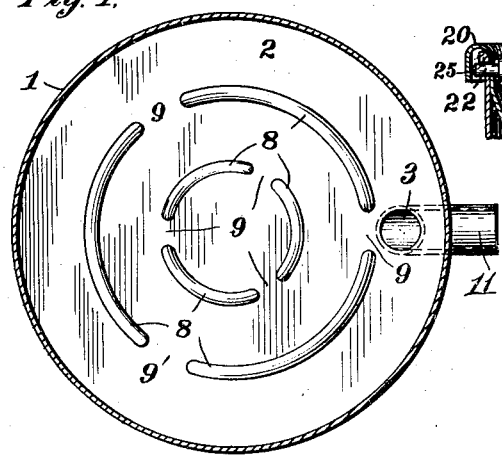
Figure 4 is a section on the line 4—4 of Figure 3.
Figure 5:
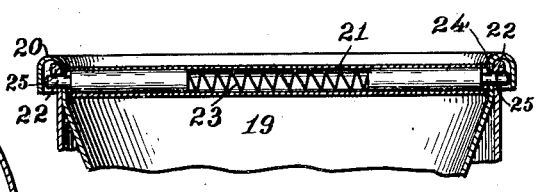
Figure 5 is a fragmentary, sectional elevation of the handle of the device and adjacent parts showing the manner of detachably securing the same in position.

Referring now to the drawings, 1 indicates a container or receptacle, preferably cylindrical, but obviously adapted to have any desired contour. The bottom 2 of the receptacle 1 is imperforate except for the opening 3 to the discharge conduit hereinafter described, and is preferably arranged in a plane above the lower edge of the device, leaving an open space 4 at the bottom. The lower edge of the side walls of the receptacle is turned inwardly and upwardly, as at 5, and the upper edge of the inturned portion forms a support for the bottom 2. Spaced above the bottom 2 is a perforate support 6 for the zeolite bed 7. The support 6 may be a screen or other plate or sheet appropriate for and capable of sustaining the bed 7. Support 6 is sufficiently spaced above the bottom 2 to permit the water which passes through the support 6 to flow freely to the discharge opening 3. To this end, bottom 2 is formed with beads 8 of sufficient height to maintain the support in spaced relation to the bottom. These beads may be of any desired form, but are preferably concentric, arcuate ridges, as shown in Figure 4, with interrupted portions 9 providing pasageways for the free circulation of the water.

Figure 1:
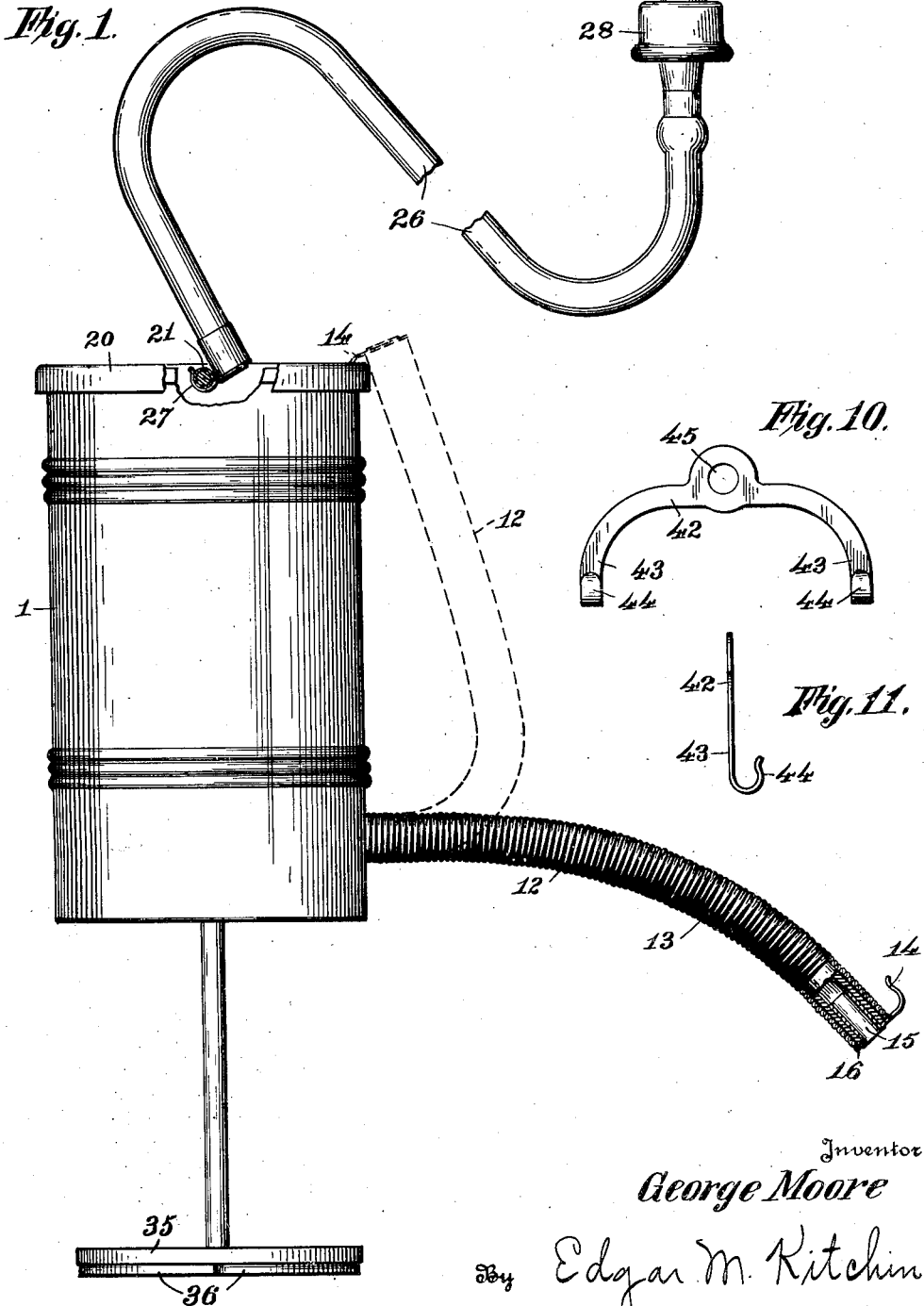
Figure 1 is an elevation of a water softener embodying my invention, the supporting device being shown partly extended.
Figure 2:
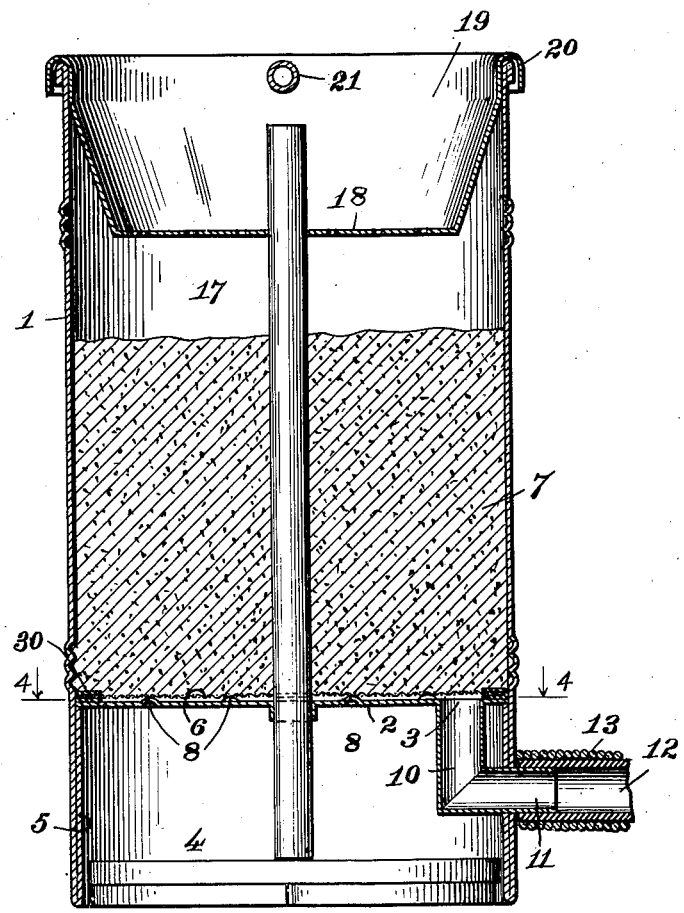
Figure 2 is a vertical, central section of the device upon an enlarged scale, the supporting device being shown in retracted position.

The container 1 is provided with a discharge conduit 10 leading downwardly from the discharge opening 3, into the space 4, and then radially to a laterally extending nipple 11 to which is attached a flexible tube 12. The tube 12, as seen in Figure 1, is of sufficient length to be turned to an upright position, and thereupon to extend above the upper end of the receptacle 1, and the outer or free end of the tube 12 is preferably provided with a hook 14 adapted to hook over the upper edge of the receptacle to retain the tube 12 out of position for discharging treated water when it is desired to avoid such discharge. The hook 14 may be secured in any appropriate manner, but is preferably formed on a sleeve 15 secured in the end of the tube 12, said sleeve terminating in an outwardly extending flange 16 which covers the end of the hose fabric, and upon which the hook 14 is formed.

To add to the life of the hose 12, the same is preferably covered with a helical wire casing 13. This prevents the hose or tube 12 from being crushed or too sharply bent, and also adds materially to the appearance of the device.

Spaced above the upper surface of the bed 7, and leaving an open area 17, is a foraminous plate 18 preferably constructed in the form of the bottom of a comparatively shallow receptacle 19 having a marginal roll 20 adapted to fit over and receive the upper edge of the receptacle 1, so that the receptacle 19 can be readily nested in receptacle 1 and thus locate the foraminous plate 18 in proper position. Other means of locating and anchoring the plate 18 will be obvious.

An operating or carrying handle 21 is preferably provided to enable the operator to manually transport the receptacle 1 and its connected parts, and the handle 21 is preferably in the form of a tube of a length to snugly fit diametrically across the walls of the receptacle 19. The tube is preferably secured in position by spring-pressed pins 22 arranged in the ends of the handle 21 and projected by a spring 23. These pins extend through registering apertures 24 and 25 of the receptacles 19 and 1 respectively, and thus detachably secure the former in the upper portion of the latter.

The plate 18 serves to break the impact of a stream of water introduced into receptacle 1 and to cause the water to enter the area 17 and drop upon the upper surface of bed 7 in miniature streams or drops without appreciable force, so that, though the operator may turn on a house faucet or other water supply having a substantial hydraulic head, the upper surface of the bed 7 will not be materially varied and no pit will be dug therein as would occur if an ordinary screen were employed in lieu of the plate 18. To supply the water to the device, a flexible hose 26 is provided having a spring hook 27 at one end to engage the handle 21 of the device, and a nipple 28 at the other end for attaching the hose to a faucet 29, or other source of supply. The screen or support 6 may be soldered or otherwise appropriately anchored to the inner surface of the receptacle 1, or it may be provided with a circumferential frame 30 adapted to rest upon the bottom 2.

In operation, the operator, when transporting the present improved water softening apparatus, usually grasps the handle 21 and carries the apparatus to the place desired. Usually, the tube or hose 12 is placed in its raised position with the hook 14 engaging the upper margin of the apparatus during such transportation. This location of the tube insures against dripping from drainings from the bed 7 after the main supply of softened water has been exhausted.

When it is desired to soften water, a supply of water is poured onto the plate 18 from any appropriate source, such as through the tube 26, and drips through the apertures of plate 18 onto the bed 7 through which it percolates until it finds its way into the space between the support 6 and bottom 2 from which it escapes through the tube 12. Tube 12, of course, will be located appropriately to cause the discharging softened water to be delivered at the required point or into the required receptacle. During the course of such action of water softening, a film of slime will collect, usually slowly, on the upper surface and in the upper portions of the bed 7, and will slow down the penetration of the bed by the water. When this occurs, the tube 12 is placed in its raised position and a supply of water is delivered to receptacle 1 sufficient to cause the water to stand at about the level of the upper surface of the bed 7, or perhaps slightly above such surface, and the receptacle is then shaken manually, preferably in an up and down or longitudinal direction, to dislodge the slimes, and then the receptacle is inverted or partly inverted to discharge the slimes-bearing water from the receptacle. The apertures in plate 18 are sufficiently small to prevent the ready escape of the zeolite particles, but the slime will break up and escape through the openings in said plate. Of course, the length of time taken to collect a film of slimes to an objectionable degree will vary according to a number of factors, including the character of the water used and the extent of continuation of use. When the slimes have thus been eliminated, the receptacle 1 is restored to its upright position and jarred or shaken sufficiently to cause the bed 7 to assume its normal position with its upper surface substantially level.

It is understood, of course, that with base exchange substances a revival is required at intervals, and where the bed 7 is of zeolites it is only necessary to supply salt to accomplish this revival. The salt may be and preferably is supplied in the form of rock salt which is allowed to stand on the perforated plate 18 and covered with water. The salt dissolves slowly and percolates through the zeolites for a brief period sufficient to effect the restoration, and then may be drawn off through the tube 12 and followed by wash water, leaving the bed 7 in restored condition ready for continuation of its original function.

When it is desired to remove the upper receptacle 19, an instrument, such as a knife blade or screw-driver, may be inserted under the rolled edge 20 to engage the pins 22 and force the same backwardly against the tension of the spring 23, the handle 21 in the meantime being grasped by the hand, and the said receptacle 19 may be readily lifted and removed by said handle. In using the device, the receptacle 1 may be rested upon any suitable support, such as a table or shelf, but I prefer to equip the device with self-contained means for supporting the same, and to so construct and arrange this supporting means that the receptacle may be held at different heights. To this end, I provide a standard formed of a series of telescopic sections, one section being fixed axially within the receptacle, and the last section of the series being equipped with a base. Referring particularly to Figure 6, 31 indicates the upper member of the telescopic support, which is arranged axially within the receptacle 1 and secured in any suitable manner to the bottom 2. Telescopically arranged within the section 31 are an intermediate section 32 and a lower section 33. These sections are maintained in extended position by spring latches 34 of a well known type which engage in apertures 34'. To the lower end of the last-mentioned section is fixed a base which may be of any suitable form. Registering, longitudinal grooves 32' are preferably formed in the sections 31, 32, 33 to prevent relative rotation of the sections to insure engagement of the latches 34 with their cooperating apertures 34'. If preferred, the tubular members may be made polygonal in cross section as indicated at 32a and 33a in Figure 13, which will prevent relative rotation. In Figures 1, 2, 6, and 7 is illustrated the preferred form, wherein the base comprises a circular disc 35, to the lower face of which are pivotally secured a plurality of arms 36. These arms are so constructed that they may be extended as illustrated in dotted lines in Figure 7, to extend the base area, and are arranged to fold under the disc 35 when not needed to extend the base area, and are each recessed, as at 37, to receive the free end of the adjacent arm in order when so folded.

In Figure 8 is illustrated a modified form of the base which comprises a cruciform member 38, each leg 39 of which is formed with a dovetailed, longitudinally-disposed slot 40 in which is arranged a sliding bar 41 which may be extended to increase the length of the arms.

When the standard is not in use, it may be telescoped within the receptacle, the base being accommodated within the space 4 in the lower end of the receptacle.

Where it is not convenient to use the telescopic support, means may be provided for suspending the device from a hook, nail, or other similar support. To this end, I provide a supporting device comprising a substantially horizontal bar portion 42 having at its ends depending arms 43 terminating in hooks 44 for engagement with the handle 21. The center of the bar 42 is provided with an eye 45 for engagement over the hook or nail. This device is preferably formed by stamping the same from sheet metal.

What is claimed is:

1. A water softener apparatus comprising a receptacle having a support therein for water softening material and a discharge below the support, a foraminous, detachable cover pendent within the upper end portion of the receptacle and having a flange overhanging the receptacle at the upper end thereof, and means within the cover adapted to serve as a handle and extending through a portion of the cover and through the wall of the receptacle to contact with said overhanging flange.

2. A water softener apparatus as claimed in claim 1 wherein the handle means has a resiliently stressed portion extending through the wall of the receptacle to contact with the overhanging flange.

3. A water softener apparatus comprising a receptacle consisting of side walls and a bottom, the lower end portion of said side walls being bent inwardly and upwardly and forming a support for said bottom, and the thus return-folded portion being of substantial length relative to the length of the receptacle so as to provide a space at the lower portion of the receptacle, a foraminous plate in the upper portion of said receptacle, a zeolite bed intermediate said bottom and said foraminous plate, a discharge tube within the space provided by said return-folded portion and extending from said bottom through the side walls of said receptacle below said bottom, and a hose communicating with the discharge end of said tube, substantially as described.

4. In water softening apparatus, a receptacle including side walls and a bottom, said bottom being arranged above the lower edge of said side walls, water softening means arranged above said bottom, means for withdrawing water from beneath said softening means, and a support for said device comprising a tubular member arranged axially within said receptacle and fixed to said bottom, and a member telescopically arranged within said tubular member and having a base at its lower end, said base being adapted to be positioned in the lower portion of the receptacle below the bottom when retracted.

5. A device as set forth in claim 4 in combination with means secured to said base and adapted to be extended beyond the edge of the same to increase the area of the base, substantially as described.

6. A portable water softener apparatus comprising a receptacle having a bottom, a zeolite bed in the receptacle, and a support for the receptacle comprising a rod telescopically engaging the receptacle and movable through the bottom into and out of area surrounded by the zeolite bed.

GEORGE MOORE.